United States Patent Office 3,576,876
Patented Apr. 27, 1971

3,576,876
PREPARATION OF O-PHENYLENEDIAMINES
William G. C. Raper, Moorabbin, Victoria, Australia, and Henry P. Crocker, Hornsea, England, assignors to Monsanto Chemicals (Australia) Limited, West Footscray, Victoria, Australia
No Drawing. Filed Dec. 7, 1966, Ser. No. 599,735
Claims priority, application Australia, Dec. 18, 1964, 53,081/64
Int. Cl. C07c 91/42, 85/10
U.S. Cl. 260—575                  6 Claims

ABSTRACT OF THE DISCLOSURE

A process for the preparation of o-phenylenediamines which comprises contacting an o-nitroaniline in the vapor or gaseous phase with hydrogen in the presence of a hydrogenation catalyst.

---

This invention relates to the preparation of o-phenylenediamine and nuclear-substituted derivatives of o-phenylenediamine.

o-Phenylenediamine and certain nuclear-substituted o-phenylenediamines are valuable raw materials used in making a range of heterocyclic compounds which find application as dyestuffs, photographic chemicals and selective biological toxicants. o-Phenylenediamines are normally obtained by reduction of the corresponding o-nitroaniline. This reduction is complicated by the fact that with the two nitrogen-containing groups in adjacent positions in the benzene ring, condensation of intermediate reduction compounds to by-products of the phenazine type occurs readily. Moreover, deactivation of the metal hydrogenation catalysts by chelation is often encountered. Therefore many of the reduction processes which are used for the reduction of nitrobenzene and m- and p-nitroanilnne cannot be employed in the preparation of o-phenylenediamines.

In accordance with the present invention there is provided a process of preparing o-phenylenediamines which comprises contacting an o-nitroaniline in the vapor or gaseous phase with hydrogen in the presence of a hydrogenation catalyst. The reaction of this invention can be represented by the following representative synthesis:

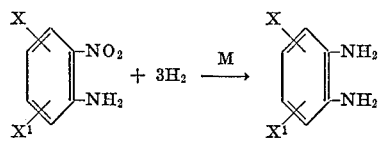

wherein X is hydrogen, hydroxy, alkyl having from 1 to 4 carbon atoms, alkoxy having from 1 to 4 carbon atoms, or haloalkyl having from 1 to 4 carbon atoms containing from 1 to 3 halogen atoms (Cl, Br, I and F); $X^1$ is selected from the group consisting of hydrogen and methyl and M is a metal catalyst selected from the group consisting of ruthenium, rhodium, palladium, osmium, iridium, and platinum.

In the above formula X can be hydrogen, hydroxyl, alkyl such as methyl, ethyl, n-propyl, isopropyl, n-butyl, isobutyl, sec-butyl and tert-butyl, alkoxy such as methoxy, ethoxy, n-propoxy, isopropoxy, n-butoxy, isobutoxy, sec-butoxy and tert-butoxy and haloalkyl such as chloromethyl, bromomethyl, fluoromethyl, iodomethyl, dichloromethyl, dibromomethyl, trichloromethyl, 2,2 - dichloroethyl, bromoethyl, fluoroethyl, 1,1,1 - trichloropropyl, 2-iodopropyl, 1,2,2 - tribromopropyl, 2-chlorobutyl, 1,3,3-trichlorobutyl, 2-bromobutyl, 1,3,3-trifluorobutyl and the like. When X is other than hydrogen or hydroxyl, the groups methyl, methoxy and trifluoromethyl are preferred. The preferred catalyst is palladium.

Suitable o-nitroaniline starting materials include o-nitroaniline; o-nitro-p-toluidine; o-nitro-p-anisidine; 2-nitro-4,5-dimethylaniline; and 4 - amino-3-nitrobenzotrifluoride.

In general, the process of the invention is carried out by bringing the reactants together in the vapor-phase at a temperature from about 180° C. to about 400° C. and preferably at a temperature from about 250° C. to about 300° C. The o-nitroaniline preferably is vaporized before being contacted with the catalyst, and is conveniently vaporized in a stream of hydrogen.

The reaction involved in the process of the invention is exothermic and cooling is advantageously employed. The process can be carried out in a multi-tubular reactor embodying a catalyst bed and equipped with a jacket containing a suitable heat-transfer medium such as water under pressure, Dowtherm, or fused salt. Alternatively the process can be carried out in a reactor containing a fluidized bed of catalyst and equipped with heat-exchangers to dissipate excess heat of reaction.

Residence or contact time of the reactants over the catalyst is not critical and is governed largely by reaction temperature and the type of reactor employed. With a fixed catalyst bed at a jacket temperature of about 275° C., an hourly liquid feed/catalyst ratio of 0.5–1 is suitable. In other words, one volume of liquid o-nitroaniline is used per volume of catalyst per hour.

The amount of hydrogen used preferably is considerably in excess of the stoichiometric requirement and serves both to vaporize the o-nitroaniline and to dissipate the heat of reaction. Moreover, in a tubular reactor, a high flow rate of hydrogen serves to spread out the reaction zone and reduce "hotspot" formation. Excess hydrogen is separated from the products and recirculated. A small purge of hydrogen is normally removed in order to prevent an accumulation of inert gases. An amount of hydrogen nearer to the stoichiometric amount can be used by diluting the hydrogen with an inert gas, for example, methane and nitrogen.

The hydrogenation catalyst is normally dispersed on a rigid, inert carrier. Suitable carriers for the catalyst metal are particles, granules or pellets of alumina, zinc oxide, magnesia, silica, or other refractory oxides including naturally occurring materials such as bauxite, fuller's earth, kieselguhr, activated clays, granulated carbon, silica gel, brickdust, and like materials.

Recovery of the o-phenylenediamine product can be effected by condensation in conventional equipment and purification, for example, by crystallization from water. The o-phenylenediamine is normally obtained in a high state of purity as an almost colorless solid.

The process of the invention is illustrated by the following non-limitative practical examples:

EXAMPLE 1 o-Phenylenediamine was prepared as follows:
o-Nitroaniline (5.52 g. 0.04 mole) was melted and added over 40 minutes in a stream of hydrogen flowing at 100 ml./min. to a catalyst bed consisting of 0.1% palladium on fuller's earth (10 ml.) contained in a ¼" I.D. glass U-tube immersed in a molten salt bath at 275° C. The effluent from the U-tube was cooled in a condenser to yield a crystalline mass and at the completion of the run this was removed, crushed roughly and dried in a desiccator over concentrated $H_2SO_4$. The yield of o-phenylenediamine obtained as almost colorless crystals. M.P. 101–103° C. was 3.86 g. (89.4% of theory).

EXAMPLE 2 o-Phenylenediamine was prepared as follows:
A mixture of hydrogen (180 litre/hour) and o-nitroaniline as vapor (50 g./hour) was passed down a bed of palladium (0.05% w./w.) on granular fuller's earth in a tubular reactor (12″ x 1″ I.D.) held in a saltbath at 300° C. Colourless crystals of o-phenylenediamine were condensed from the effluent gas in a yield of 85%. No impurity could be detected in the dried product.

What is claimed is:

1. Process for the preparation of compounds of the formula

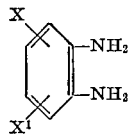

wherein X is selected from the group consisting of hydrogen, hydroxy, alkyl containing from 1 to 4 carbon atoms, alkoxy containing from 1 to 4 carbon atoms and trifluoromethyl; and $X^1$ is selected from the group consisting of hydrogen and methyl; which comprises contacting, in the vapor phase at a temperature from about 180° C. to about 400° C. an o-nitroaniline of the formula

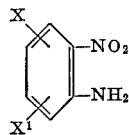

wherein X and $X^1$ are as defined above, with an excess of hydrogen, said excess hydrogen serving both to vaporize the o-nitroaniline and to dissipate the heat of reaction, in the presence of a catalyst selected from the group consisting of ruthenium, rhodium, palladium, osmium, iridium and platinum.

2. Process of claim 1 wherein the o-nitroaniline and hydrogen are contacted at a temperature from about 250° C. to about 300° C.

3. Process of claim 1 wherein the o-nitroaniline is selected from the group consisting of o-nitroaniline, o-nitro-p-toluidine, o-nitro-p-anisidine, 2-nitro-4,5-dimethylaniline and 4-amino-3-nitrobenzotrifluoride.

4. Process of claim 1 wherein the catalyst is palladium.

5. Process of claim 1 wherein the catalyst is dispersed on an inert carrier.

6. Process of claim 1 which is continuous.

References Cited

UNITED STATES PATENTS

| | | | |
|---|---|---|---|
| 3,194,839 | 7/1965 | Robinson et al. | 260—575 |
| 3,230,259 | 1/1966 | Levy | 260—580 |

OTHER REFERENCES

Groggins: Unit Processes in Org. Syn., 1958, p. 175.

Groggins: Unit Processes in Organic Synthesis, McGraw-Hill Book Co., Inc., New York, 1958, p. 177.

CHARLES B. PARKER, Primary Examiner

C. F. WARREN, Assistant Examiner

U.S. Cl. X.R.

260—580, 689